United States Patent [19]

Ayres

[11] 3,894,952

[45] *July 15, 1975

[54] SERUM/PLASMA SEPARATOR ASSEMBLY HAVING INTERFACE-SEEKING PISTON

[75] Inventor: Waldemar A. Ayres, Rutherford, N.J.

[73] Assignee: Becton, Dickinson and Company, East Rutherford, N.J.

[ * ] Notice: The portion of the term of this patent subsequent to June 24, 1992, has been disclaimed.

[22] Filed: Feb. 27, 1974

[21] Appl. No.: 446,357

[52] U.S. Cl. .............. 210/136; 210/314; 210/359; 210/516; 210/DIG. 23
[51] Int. Cl. ............................................ B01d 21/26
[58] Field of Search ....... 23/230 B, 258.5, 259, 292; 128/2 F, 214 R, 218 M, 272; 210/83, 84, 109, 131, 359, 514–518, DIG. 23, DIG. 24, 136, 314; 233/1 A, 1 R, 26

[56] References Cited
UNITED STATES PATENTS

| | | | |
|---|---|---|---|
| 2,577,780 | 12/1951 | Lockhart | 128/272 X |
| 3,539,300 | 11/1970 | Stone | 210/DIG. 24 |
| 3,661,265 | 5/1972 | Greenspan | 210/359 |
| 3,782,548 | 1/1974 | Bowen | 210/DIG. 23 |

*Primary Examiner*—Charles N. Hart
*Assistant Examiner*—Robert H. Spitzer
*Attorney, Agent, or Firm*—Kane, Dalsimer, Kane, Sullivan and Kurucz

[57] ABSTRACT

A blood collection and separator assembly of the type suitable for centrifuging to separate the plasma/serum or light phase from the heavy or cellular phase of blood is disclosed. The assembly includes a collection container and a piston slidably disposed therein for sealing off the plasma or serum phase from the cellular or heavy phase of blood after centrifuging is terminated. The piston is formed having a specific gravity greater than the specific gravity of blood and the interface-seeking piston is positioned in the container and includes at least two spaced sealing rings which contact the inner surfaces of the container. The piston provides a passage for conducting separated serum/plasma from below the piston to above the piston. A filter means is positioned on the piston and is in fluid communication with the passage therewith so that the serum/plasma is filtered as it passes through the passage. The lower sealing ring is deformable and acts like a valve to open the passage when the piston is subjected to centrifugation. The piston moves downward in the container and automatically stops at the serum/plasma-cellular inter face, when the filter means becomes clogged by the heavy phase. When the piston descent is stopped the deformed sealing ring closes the passage thereby forming a barrier between the heavy and light phases of the blood.

11 Claims, 3 Drawing Figures

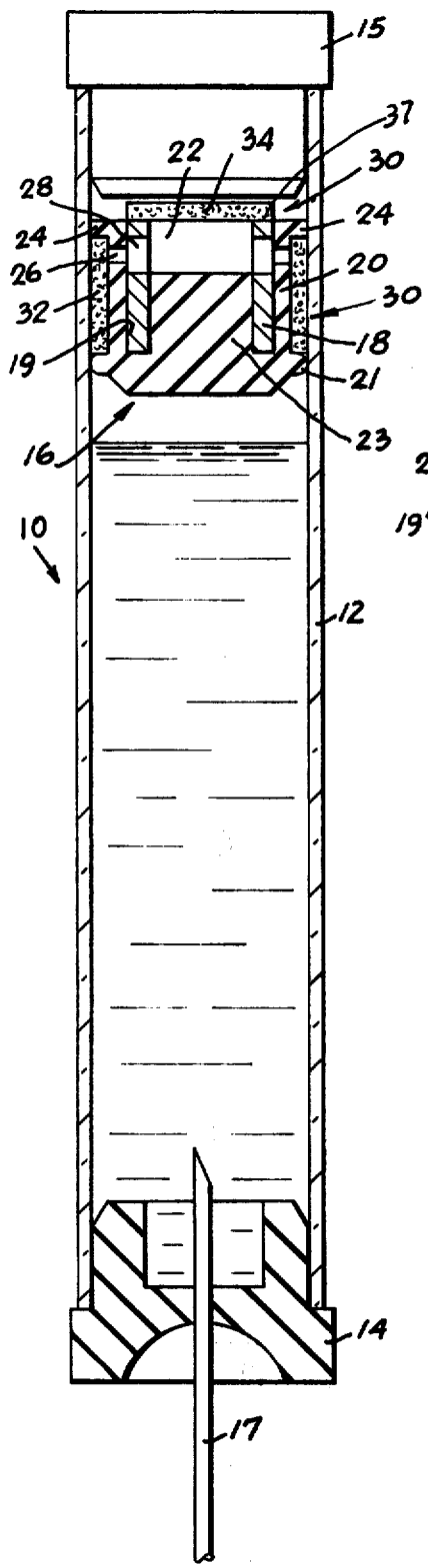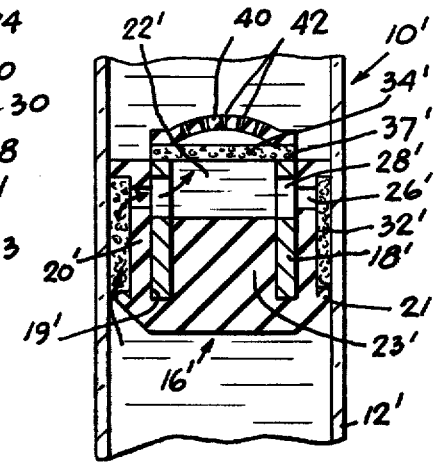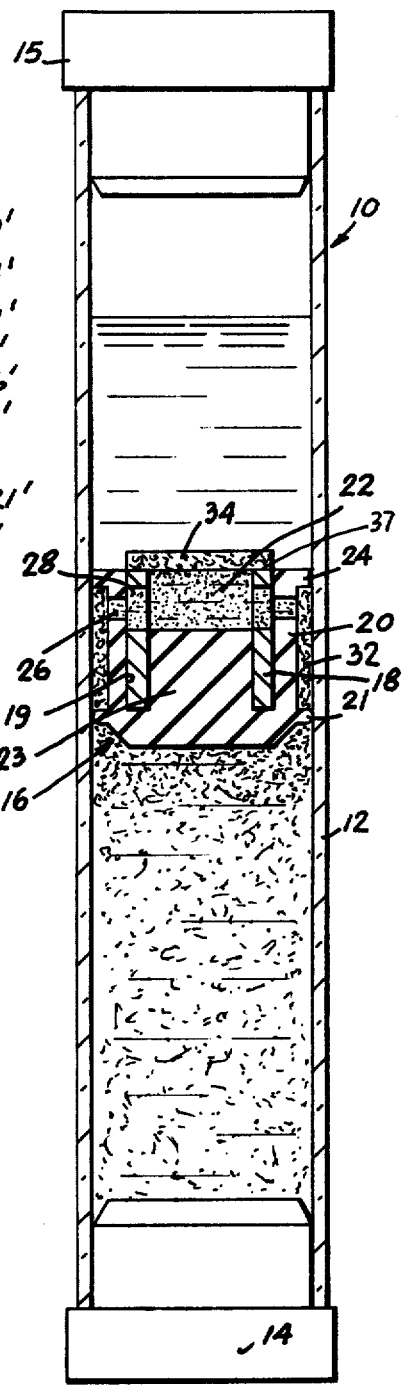

SERUM/PLASMA SEPARATOR ASSEMBLY HAVING INTERFACE-SEEKING PISTON

BACKGROUND OF THE INVENTION

This invention relates generally to plasma/serum separator assemblies and particularly to a plasma/serum separator having a piston slidably disposed in a collection container for receiving blood. An interface-seeking piston includes a sealing ring which is normally sealed but which is temporarily deformed and will automatically open when the assembly is subjected to centrifugal force to provide an opening to a passageway formed in the piston. The piston also includes a filter means disposed in fluid communication with the passageway so that as the plasma or serum passes through the passageway it is filtered to remove any solid materials that may be present in the plasma or serum phase and automatically stops at the plasma/serum-cellular interface when the filter means becomes clogged.

DESCRIPTION OF THE PRIOR ART

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a deformable piston made of a resilient material or valve means associated with the piston to affect a sealed separation after centrifugation.

SUMMARY OF THE INVENTION

It is an object of the present invention to provide a plasma/serum separator assembly which includes an interface-seeking piston having a coarse filter and a fine filter and a passageway means providing access to said coarse filter and connecting the coarse filter and fine filter, for filtering the light phase of the blood and preventing flow through of the heavy phase of the blood.

It is another object of the invention to provide an interface-seeking piston having a passageway associated therewith that will not be accidentally opened when the container is being filled with whole blood because of the pressure difference of blood at atmospheric pressure and the vacuum on the other side of the sealing ring.

It is also an object of the invention to provide a piston having filter means which will prevent solid materials contained in the blood from passing into the separated plasma or serum phase and to provide a piston which automatically stops at the plasma/serum-cellular interface.

It is another object of the invention to provide a plasma/serum separator assembly which is economical to manufacture and can be used in conjunction with standard blood collecting equipment.

My invention generally contemplates the provision of a separator assembly which includes a blood collection container for receiving blood, the container having at least one open end which is adapted to receive a closure for sealing the open end of the container. An interface-seeking piston is formed having a specific gravity greater than the specific gravity of plasma or serum and is slidably disposed in the container. The piston includes a pressure responsive sealing ring which deforms and automatically opens a passageway when the assembly is subjected to centrifugal force and the piston moves downwardly and which automatically closes when the piston descent is terminated. A coarse filter means is disposed in the piston in fluid communication with the passage so that the plasma and/or serum, after passing therethrough, is also filtered by the fine filter means to remove any cellular material contained in the blood. The piston automatically stops at the plasma/serum-cellular interface when the fine filter means becomes clogged.

DESCRIPTION OF THE DRAWINGS

For a better understanding of the invention reference is had to the drawings which illustrate the preferred embodiments of the invention herein.

FIG. 1 is a sectional, elevational view of the plasma/serum separator assembly showing a pointed cannula penetrating one of the stoppered ends of the container through which blood is introduced into the container prior to its separation.

FIG. 2 is a sectional, elevational view showing the position of the piston at the plasma/serum-cellular interface after the assembly has been centrifuged.

FIG. 3 is a sectional, elevational view partly broken away illustrating another form of an interface-seeking piston moving downwardly in the container with the passage open during centrifuging for conducting plasma/serum through the filter means.

For a better understanding of the invention herein a description of the preferred embodiment is provided which is shown in FIGS. 1 and 2.

In FIG. 1 separator assembly 10 comprises a tubular member or container 12 which is sealed at its open ends by closure members 14 and 15. Closure members 14 and 15 are preferably made of elastomeric material and are capable of being penetrated by a cannula 17 so that blood can be transferred from a blood source into the container under aseptic conditions. Closures 14 and 15 are preferably self-sealing so that when the cannula is removed from closure 14 there will be no loss of blood passing through the penetration portion of closure 14. As depicted in FIG. 1, blood is being conducted through cannula 17 and is shown filling container 12 to about the point where piston 16 is positioned adjacent closure member 15. Thereafter, cannula 17 is removed and assembly 10 is ready for centrifuging for separation of the blood into the plasma or serum phase and the cellular phase. In this connection, lower seal ring 21 will not be deformed or accidentally open by the pressure differential between blood at atmospheric pressure and the vacuum that is present on the top side of ring 21 and in filter 32.

Disposed in container 12 is piston 16 which includes a tubular metal insert 18 which is mounted in the annular recess 19 of piston 16. Metal insert 18 is preferably made of stainless steel or other rigid, chemically inert material having a specific gravity substantially greater than blood. The body of piston 16 is preferably formed of elastomeric material. Annular recess 19 of piston 16 is dimensioned to receive tubular member 18 in an interference fit so that no air space remains in annular recess 19.

The elastomeric body portion of piston 16 comprises an outer wall 20 and spaced therefrom is a centrally positioned recess or chamber 22. Central body portion 23 is spaced from wall 20 so that the respective wall surfaces define annular recess 19. Formed integrally with wall 20 at its upper end is resilient sealing ring 24 which contacts the inner wall surface of container 12 in sealing liquid tight engagement and cannot be deformed by the hydrostatic pressure by the plasma or serum exerted against it during centrifuging.

Deformable sealing ring 21 which extends radially from the lower end of piston 16 remains in sealing contact with the inner surface of container 12 when the assembly is not in use and prior to centrifuging. When assembly 10 is centrifuged, the hydrostatic pressure exerted by the plasma or serum during the descent of the piston deforms ring 21 to permit plasma or serum to bypass ring 21 and flow through piston 16 in the direction of the arrows illustrated in FIG. 3.

A passage is provided around and through piston 16 and includes coarse filter 32 between seal rings 21 and 24 and is connected to chamber 22 by one or more aligned openings 26 and 28 formed in wall 20 of piston 16 and metal insert 18 as illustrated in FIG. 1

Filter means 30 includes a coarse filter element 32 and a fine filter element 34. Coarse filter element 32 has a pore size large enough to pass the cellular phase of blood but will remove any fibrin strands or other like materials. Coarse filter 32 may be made of a felt or plastic foam material of the open cell type in which there are interconnecting passages formed between the cells to permit the flow of fluid therethrough. Also, filter 32 when mounted on piston 16 and between seal rings 21 and 24 forms a compression fit so that when assembly 10 is centrifuged, filter element 32 remains in sliding contact with the inner wall surface of container 12. Fine filter element 34 has a pore size smaller than red blood cells and will prevent the heavy phase material from passing into the filtered serum/plasma phase. Fine filter 34 is in the form of a disc and is cemented or otherwise secured or bonded to metal insert 18 around its top edge at 37. Filter element 34 may be made of any suitable material which is inert to blood and has pores smaller than blood cellular material.

FIG. 3 illustrates another form of the invention in which piston 16 has been modified. Piston 16' is constructed and arranged as illustrated in FIGS. 1 and 2 except for the addition of elastomeric disc or diaphragm 40. All corresponding parts are similarly identified as primes.

Elastomeric disc 40 has resilient apertures or slits 42 formed therein. Disc 40 is secured around its outer edges to fine filter 34' by any suitable means such as adhesive, heat sealing or the like.

The purpose of disc 40 and its resilient apertures is to provide valve means which will automatically open during piston descent and later automatically close when the piston stops. This provides an automatic hermetic seal above the fine filter 34, thereby completely isolating the serum or plasma. In all other ways, the actions of the piston in FIG. 1 and the piston in FIG. 3 are identical.

While variations of the invention herein may be had, the objectives of the invention have been illustrated and described and it is contemplated that changes in design can be made without departing from the spirit of the invention described herein.

What is claimed is:

1. A separator assembly capable of separating blood into a plasma/serum or light phase and a cellular or heavy phase comprising:
   a container having at least one open end which is adapted to receive blood for subsequent separation into a light phase and a heavy phase;
   a closure sealing the open end of the container, the closure being formed of a self-sealing, elastomeric material which is penetrable by a cannula through which blood to be separated is conducted into the container;
   an interface-seeking piston having a specific gravity greater than blood and slidably mounted in the container adjacent one end thereof and adapted to move downwardly in said container under the influence of centrifugal force;
   said piston having at least two spaced sealing rings on an outer surface in sealing engagement with the inner surface of the container;
   said piston having a passage for conducting separated serum/plasma;
   one of said seal rings being deformable to provide an opening to connect said passage with the container below the piston;
   coarse filter means mounted on said piston and being in fluid communication with said passage so that all the separated plasma/serum is filtered as the piston moves downwardly in the container, said coarse filter having pore sizes large enough to pass the cellular phase of the blood but small enough to remove fibrin strands; and
   fine filter means having a pore size smaller than said cellular phase, mounted on said piston so as to receive the plasma/serum filtered by the coarse filter means whereby when the piston reaches said interface it will automatically stop.

2. The separator assembly of claim 1, wherein the deformable sealing ring is positioned at the lower end of said piston and the other sealing ring is positioned at the upper end thereof.

3. The separator assembly of claim 2, wherein the upper sealing ring maintains a liquid tight seal with the inner surface of the container.

4. The separator assembly of claim 1, wherein said coarse filter is disposed between the upper and lower seal rings.

5. The separator assembly of claim 4, wherein the fine filter is a filter disc mounted across the upper surface of the piston and covers an open end of the passage formed in the piston.

6. The separator assembly of claim 5, wherein a valve means is mounted on the piston and over said fine filter, said valve means comprising a resilient diaphragm having at least one aperture therein which is normally closed but opens when said diaphragm is stretched.

7. A piston capable of separating the plasma/serum or light phase and a cellular or heavy phase of blood disposed in a separator assembly including a container, said piston comprising:
- an interface-seeking piston having a specific gravity greater than blood and slidably mounted in the container adjacent one end thereof and adapted to move downwardly in said container under the influence of centrifugal force;
- said piston having at least two spaced sealing rings on an outer surface in sealing engagement with the inner surface of the container;
- said piston having a passage for conducting separated serum/plasma;
- one of said seal rings being deformable to provide an opening to connect said passage with the container below the piston;
- coarse filter means mounted on said piston and being in fluid communication with said passage so that the separated plasma/serum is filtered as the piston moves downwardly in the container, said coarse filter having pore sizes large enough to pass the cellular phase of the blood but small enough to remove fibrin strands; and
- fine filter means having a pore size smaller than said cellular phase, mounted on said piston so as to receive the plasma/serum filtered by the coarse filter means whereby the fine filter means becomes clogged by said cellular phase to automatically stop the piston.

8. The piston of claim 7, wherein the deformable sealing ring is positioned at the lower end of said piston and the other sealing ring is positioned at the upper end thereof.

9. The piston of claim 8, wherein said coarse filter is disposed between the upper and lower seal rings.

10. The piston of claim 9 wherein the fine filter is a filter disc mounted across the upper surface of the piston and covers an open end of the passage formed in the piston.

11. The piston of claim 10, wherein a valve means is mounted on the piston and over said fine filter, said valve means comprising a resilient diaphragm having at least one aperture therein which is normally closed but opens when said diaphragm is stretched.

* * * * *